(12) United States Patent
Song et al.

(10) Patent No.: US 7,394,529 B2
(45) Date of Patent: Jul. 1, 2008

(54) FINGERPRINT SENSOR USING MICROLENS

(75) Inventors: Ki Bong Song, Daejeon (KR); Dae Gyu Moon, Gyeonggi-do (KR)

(73) Assignee: Eletronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 11/485,760

(22) Filed: Jul. 12, 2006

(65) Prior Publication Data
US 2007/0041005 A1    Feb. 22, 2007

(30) Foreign Application Priority Data
Jul. 13, 2005    (KR) ................ 10-2005-0063290

(51) Int. Cl.
*G06K 9/74*    (2006.01)
(52) U.S. Cl. ........................................... 356/71
(58) Field of Classification Search ............... None
See application file for complete search history.

(56) References Cited

U.S. PATENT DOCUMENTS 5,446,290 A * 8/1995 Fujieda et al. .............. 250/556

FOREIGN PATENT DOCUMENTS

| JP | 07-062865 | 3/1995 |
| JP | 2003-006627 | 1/2003 |
| KR | 1020030075400 A | 9/2003 |
| KR | 1020040034776 A | 4/2004 |

OTHER PUBLICATIONS

Optics Letters, Use of mass transport to reduce surface roughness in replicated gallium phosphide refractive microlenses, Apr. 15, 2000, vol. 25, No. 8, pp. 515.
Jpn. J. Appl. Phys., Microoptical Two-Dimensional Devices for the Optical Memory Head of an Ultrahigh Data Transfer Rate and Density Sytem using a Vertical Cavity Surface Emitting Laser (VCSEL) Array, vol. 41 (2002) pp. 4835-4840.
Appl. Phys. Lett., Large-numerical-aperture microlens fabrication by one-step etching and mass-transport smooting, 64 (12), Mar. 21, 1994.

* cited by examiner

*Primary Examiner*—Michael P Stafira
(74) *Attorney, Agent, or Firm*—Blakely, Sokoloff, Taylor & Zafman LLP

(57) ABSTRACT

Provided is a fingerprint sensor using a microlens including the microlens changing a path of light reflected by a fingerprint structure, and an optical-TFT checking the fingerprint structure from the light whose path is changed. Since the microlens including the spherical lens to change the path of light is provided, the amount of light incident on the light measuring area can be maximized. Also, since the noise such as dispersed light is exhausted by the spherical lens outside the light measuring area, the effect by the noise can be minimized.

14 Claims, 6 Drawing Sheets

FINGERPRINT SENSOR USING MICROLENS

CROSS-REFERENCE TO RELATED PATENT APPLICATIONS

This application claims the benefit of Korean Patent Application No. 10-2005-0063290, filed on Jul. 13, 2005, in the Korean Intellectual Property Office, the disclosure of which is incorporated herein in its entirety by reference.

BACKGROUND OF THE INVENTION

1. Field of the Invention

The present invention relates to a light reflection type fingerprint sensor, and more particularly, to a fingerprint sensor which improves the light efficiency of an optical-TFT (thin film transistor) in a unit cell by using a microlens.

2. Description of the Related Art

As information communication devices become smaller, cheaper, and modularized, personal information security devices through obtainment of bioinformation of an individual are gradually made small and thin. A typical bioinformation is a fingerprint. A method of recognizing a physical system that is conventional security device has been replaced by bioinformation obtainment method. There are various methods of obtaining the bioinformation and a typical device therefor is a fingerprint sensor. The fingerprint sensor that is presently used includes an optical type using an image sensor and a prism and an electrostatic type using the difference in thickness of a pattern of a fingerprint structure.

FIG. 1 is a cross-sectional view of a unit cell of a light reflection type fingerprint sensor that is an example of a conventional fingerprint sensor. Referring to FIG. 1, the unit cell of the fingerprint sensor includes a light emitting portion 10, a transparent substrate 20, an optical-TFT 30, and an electric-TFT 40. TFTs 30 and 40 are manufactured on the transparent substrate 20 that is a glass substrate. A backlight of a liquid crystal display device can be used as the light emitting portion 10.

An input light 12 emitted by the light emitting portion 10 and transmitting the TFTs 30 and 40 is reflected by a fingerprint structure 50. The reflected light is converted to an electric signal by the optical-TFT 30 formed on the substrate 20 and stored as electric charges. The stored electric charges are converted to an electric signal by the electric-TFT 40. When the electric signal is measured and processed in an appropriate method, the fingerprint structure 50 by the optical reflection can be checked.

In the optical reflection type fingerprint sensor of FIG. 1, there is a limit in reducing the size of a light source and an accurate image cannot be obtained because information is obtained from a reflected image. Also, in a fingerprint sensor using a contact light emitting device that is another type of the fingerprint sensor, since light is dispersed at a boundary surface between a light receiving device and a transparent insulation adhesive, adjacent pixel is affected.

SUMMARY OF THE INVENTION

To solve the above and/or other problems, the present invention provides a fingerprint sensor which can obtain an accurate image and prevent the influence by dispersion of light.

According to an aspect of the present invention, a fingerprint sensor using a microlens comprises the microlens changing a path of light reflected by a fingerprint structure, and an optical-TFT checking the fingerprint structure from the light whose path is changed.

A spherical lens having a convex shape of a predetermined curvature is formed at a side of the microlens. The curvature of the spherical lens is determined by a degree that an input light is reflected.

A rear surface having a flat surface to reflect the input light is formed at the opposite side of the microlens. The rear surface comprises a rear surface focal point that is the focus of the input light.

The microlens exhausts dispersed light to the outside of the TFT.

According to another aspect of the present invention, a fingerprint sensor using a microlens comprises a light emitting portion emitting input light, the microlens including a spherical lens having a predetermined curvature to change a path of the input light reflected by a fingerprint structure, and an optical-TFT having a light measuring area which receives reflected light whose path is changed and converting the reflected light to an electric signal.

The optical-TFT further comprises a light transmitting area having an inverse symmetric structure to the light measuring area and transmitting the input light.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
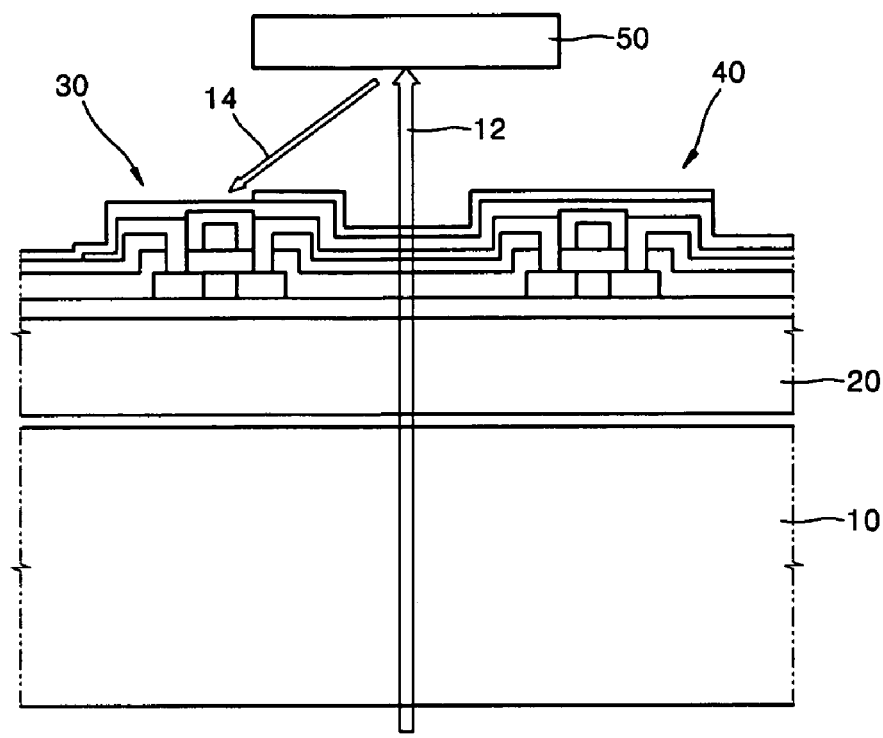
FIG. 1 is a cross-sectional view of a unit cell of a light reflection type fingerprint sensor which is one of the conventional fingerprint sensor.

In the accompanying drawings, the thickness of a layer is exaggerated for the convenience of explanation. The same reference numerals indicate the same elements having the same functions.

Figure 2A:
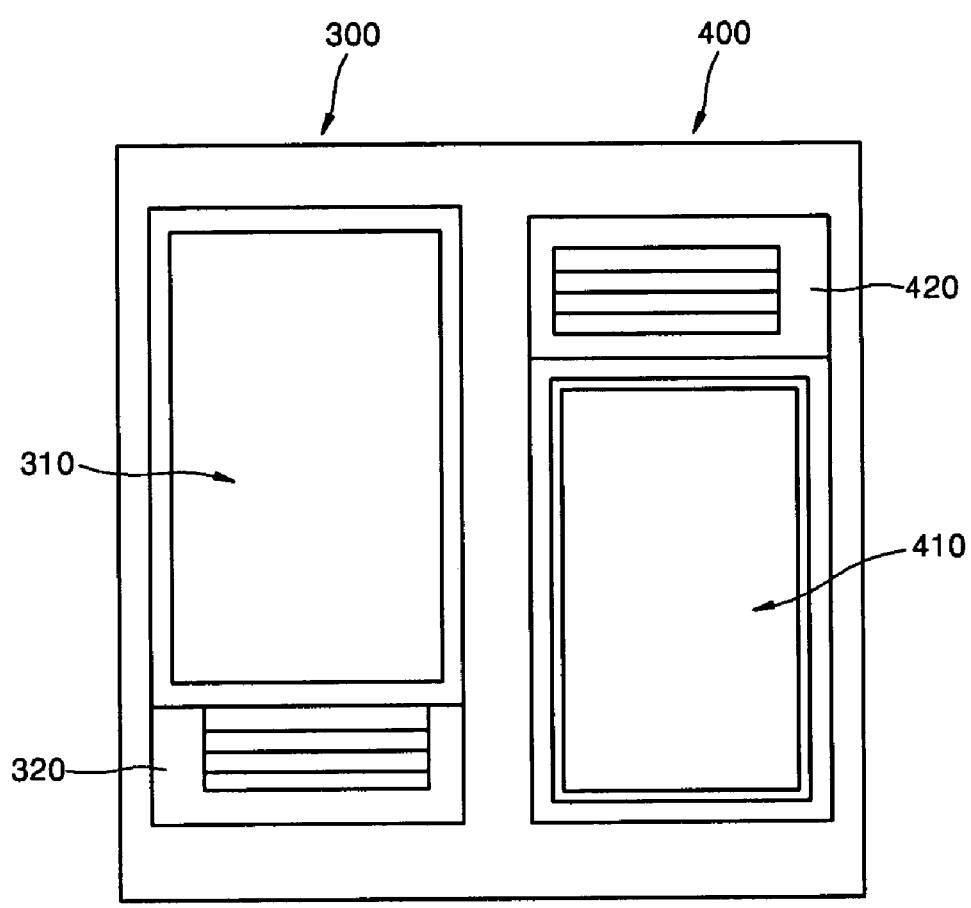
FIG. 2A is a plan view of a substrate where a TFT used in the present invention is formed.
Figure 2B:
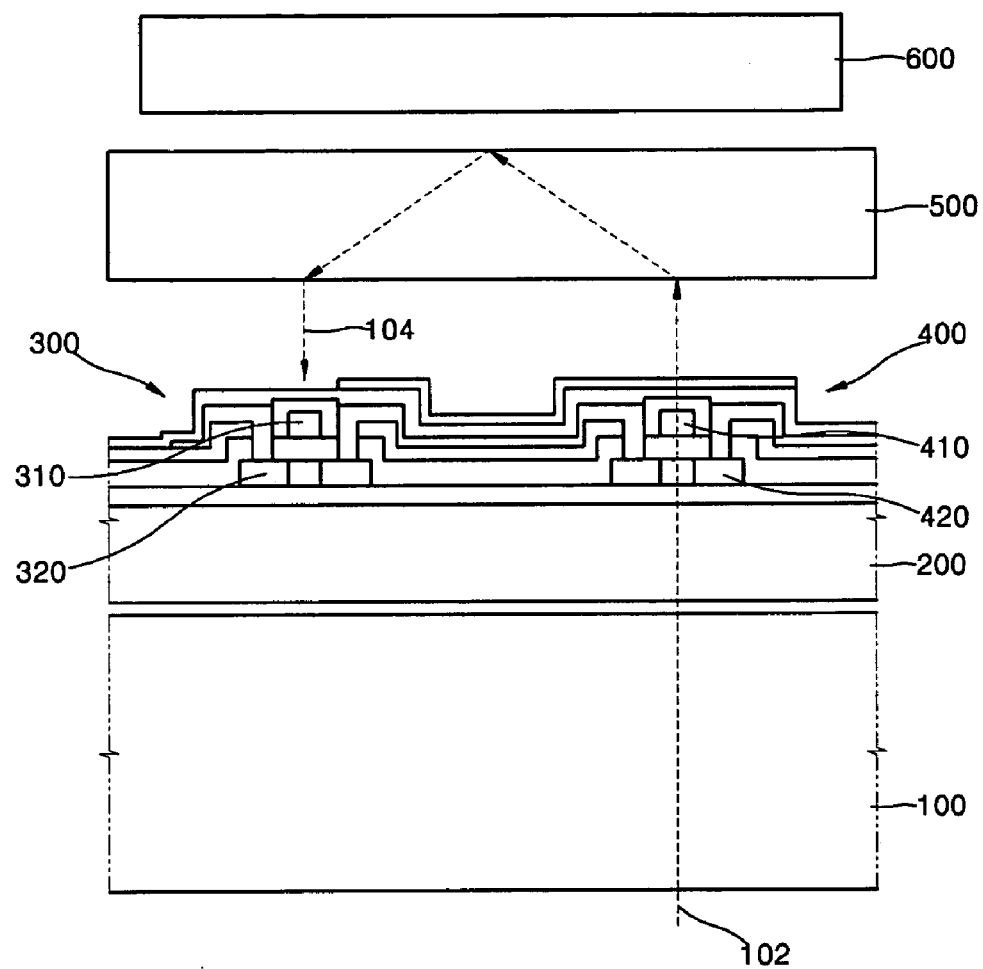
FIG. 2B is a cross-sectional view of the fingerprint sensor including FIG. 2A.

FIG. 2A is a plan view of a substrate where a TFT used in the present invention is formed. FIG. 2B is a cross-sectional view of the fingerprint sensor including FIG. 2A. Referring to FIGS. 2A and 2B, a unit cell of a fingerprint sensor according to an embodiment of the present invention includes a light emitting portion 100, a transparent substrate 200, an optical-TFT 300, an electric-TFT 400, and a microlens 500. The TFTs 300 and 400 are manufactured on the transparent substrate 200 such as a glass substrate. A backlight of a liquid crystal display device can be used as the light emitting portion 100. An input light 102 emitted by the light emitting portion 100 and transmitting the TFTs 300 and 400 is reflected by a fingerprint structure 600. A reflection light 104 is converted to an electric signal by the optical TFT 300 formed on the substrate 200 and stored as electric charges. The stored electric charges are converted to an electric signal by the electric- TFT 400. The fingerprint structure 600 can be checked by measuring and processing the electric signal in an appropriate method.

The optical-TFT 300 including a light measuring area 310 and the electric-TFT 400 including light transmitting area 410 have an inverse symmetric structure. FIG. 2A shows an example of the inverse symmetric structure. The inverse symmetric structure is formed for the following reason. Assuming that no light sensor component exists between the two TFTs 300 and 400 formed on the transparent substrate 200, the light transmitting the electric-TFT 400 is reflected by the fingerprint structure 600 and returned to the electric-TFT 400 due to the linear movement feature of the light in spite of the diffraction feature of the light. For the light transmitting the electric-TFT 400 to be incident on the optical-TFT 300, a unit cell having an inverse symmetric structure with respect to an optical axis needs to be formed.

For the inverse symmetric structure, the microlens 500 is inserted between each of the TFTs 300 and 400 and the fingerprint structure 600 to change the optical path to be inversed with respect to the optical axis. The TFTs 300 and 400 respectively includes non-transmitting metal layers 320 and 420 arranged to face the optical axis.

Figure 3A:
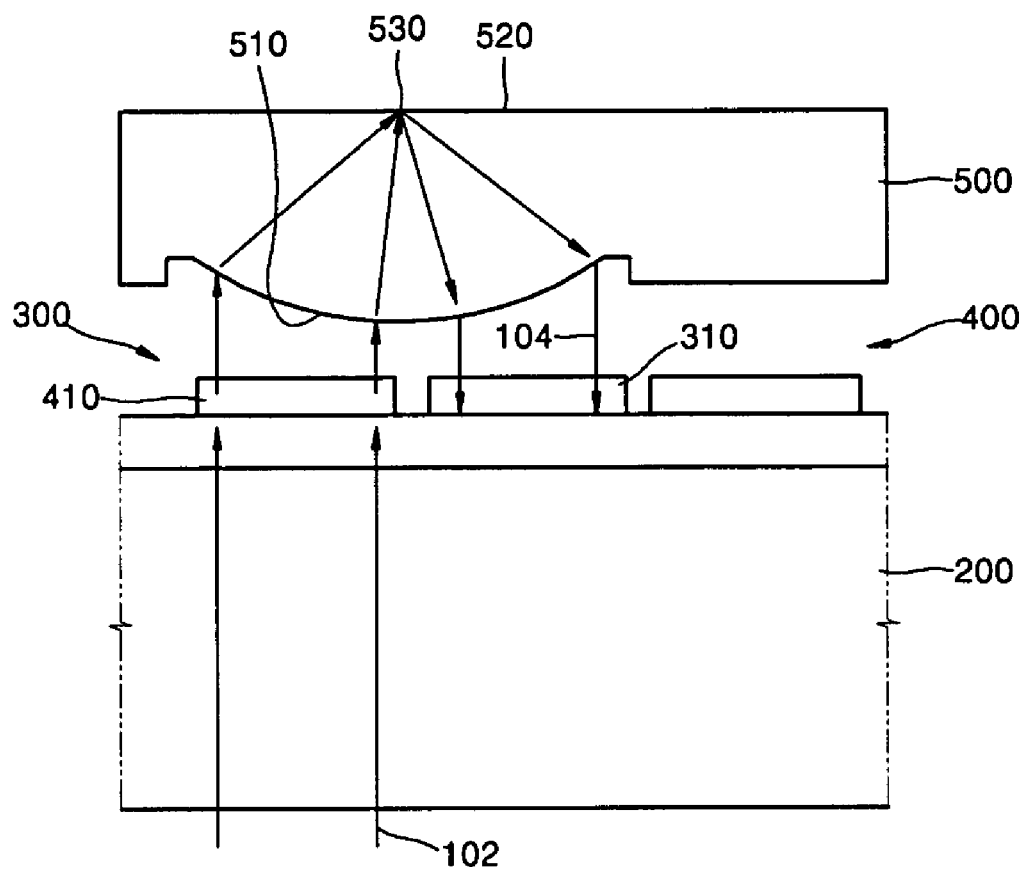
FIG. 3A is a cross-sectional view for explaining the inversion and focusing of light using a microlens according to an embodiment of the present invention.
Figure 3B:
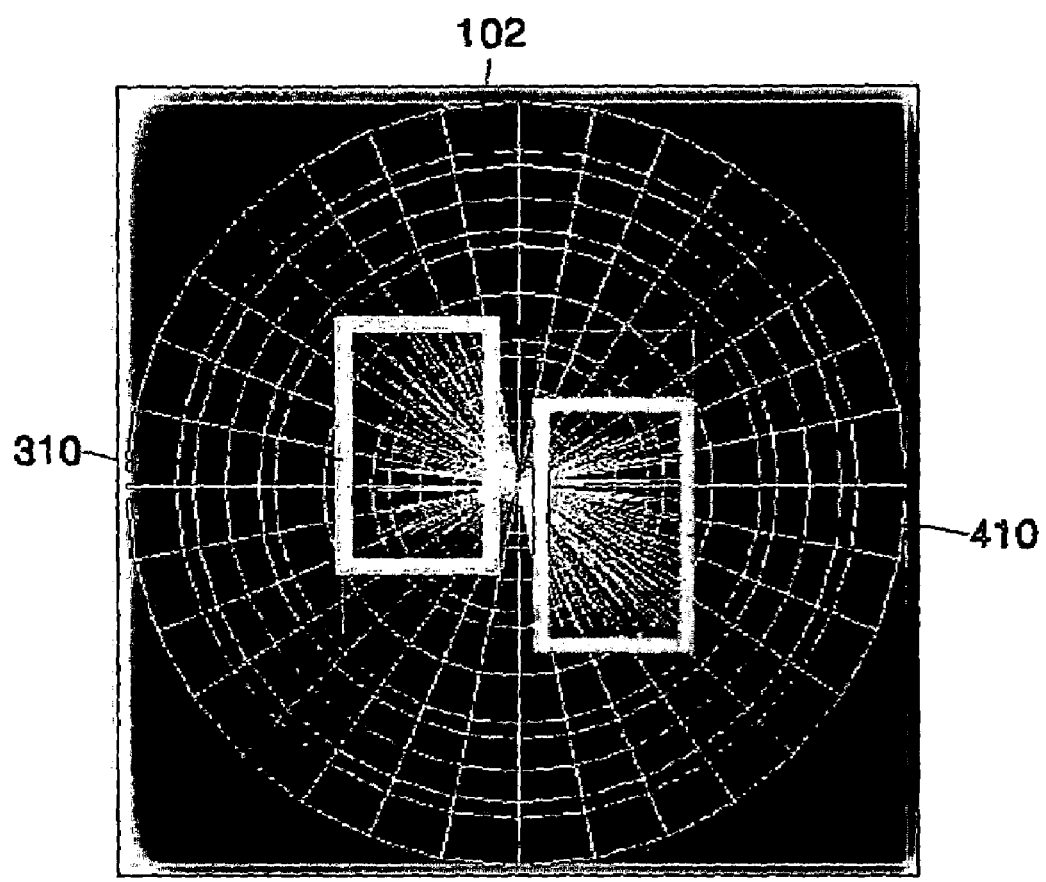
FIG. 3B is a view showing the change of an optical path viewed from the microlens of FIG. 3A.

FIG. 3A is a cross-sectional view for explaining the inversion and focusing of light using a microlens according to an embodiment of the present invention. FIG. 3B is a view showing the change of an optical path viewed from the microlens of FIG. 3A. Referring to FIGS. 3A and 3B, the microlens 500 makes the input light 102 passing through the light transmitting area 410 incident on the light measuring area 310. The microlens 500 has a front surface (not shown) located adjacent to the substrate 200 and a rear surface 520 located far from the substrate 200. The microlens 500 is manufactured of a high refractive material. The front surface includes a convex shape toward the substrate 200 and includes a spherical lens 510 having a particular curvature and a flat portion located in a portion for performing an electric signal process. The light passing through the spherical lens 510 covers both the light measuring area 310 and the light transmitting area 410. The curvature of the spherical lens 510 is determined by a degree that the input light 102 is reflected, for example, a reflection angle. The rear surface 520 is a surface located opposite to the front surface where the spherical lens 510 is formed, and has a flat surface to reflect the input light 102. Also, the rear surface 520 includes a rear surface focal point 530 which is the focus of the input light 102.

Figure 4:
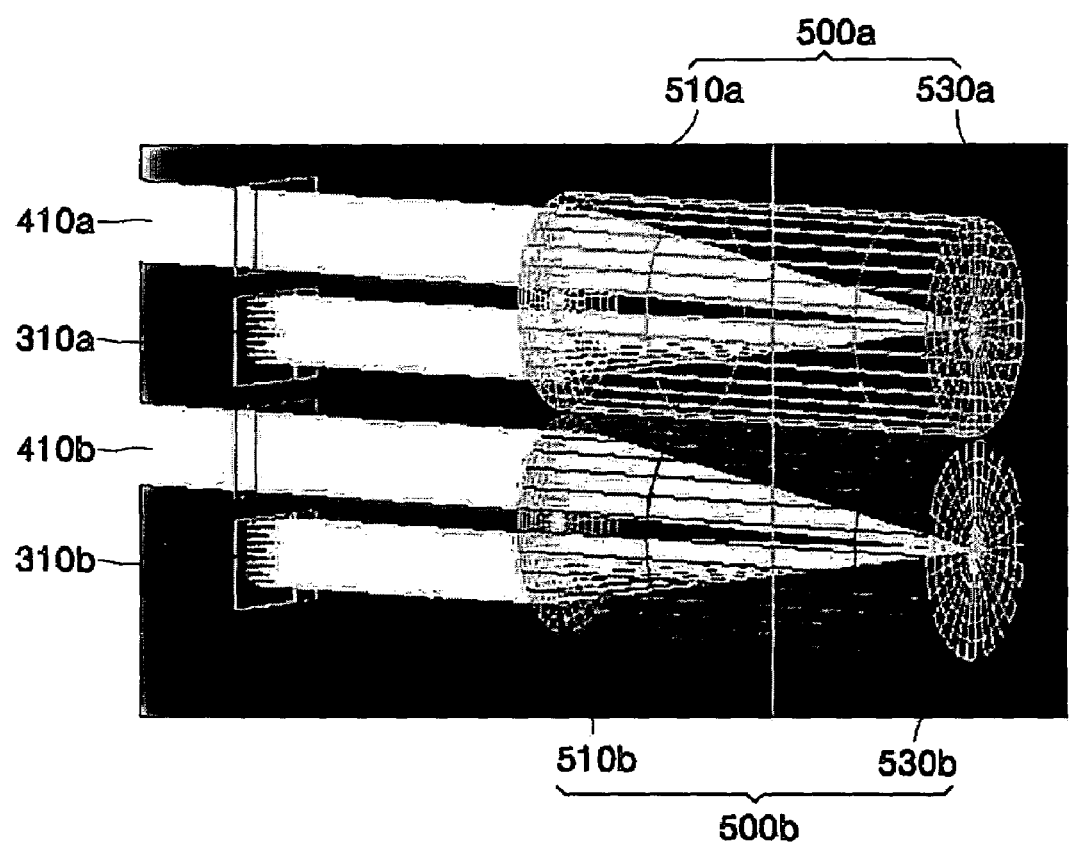
FIG. 4 is a view showing the result of simulation in which light is focused by the microlens.

FIG. 4 is a view showing the result of simulation in which light is focused by the microlens 500 according to an embodiment of the present invention. The microlens 500 consists of a plurality of microlenses 500a and 500b. The microlenses 500a and 500b respectively include spherical lenses 510a and 510b, and rear surface focal points 530a and 530b. In the present embodiment, the microlens 500 has a refractive index of about 3.4, a lens thickness of about 400 μm, and a distance between the optical-TFT 300 and the microlens 500 of about 200 μm.

Referring to FIG. 4, when the simulation is performed assuming that the rear surface focal points 530a and 530b are focuses of the input light 102, the curvature of the spherical lens 510 can be about 0.285 mm. The rear surface focal points 530a and 530b are formed on the rear surface 520 opposite to the spherical lens 510 because the reflection light 104 by bioinformation such as a fingerprint is most generated. In detail, since the difference between signals measured in the light measuring area 310 due to the difference in reflective rate of the fingerprint structure 600 is a multiplication of the whole focused light by the reflective rate, the largest signal difference can be obtained.

When the focus is formed on the rear surface 520 of the microlens 500, optical noise due to dispersed light that makes noise can be minimized. That is, the microlenses 500a and 500b not only improve light efficiency by the difference in reflection rate of the fingerprint structure 600, but also function as a filter that exhausts the light corresponding to the noise to the outside of the TFTs 300 and 400.

As described above, in the fingerprint sensor according to the present invention, since the microlens including the spherical lens to change the path of light is provided, the amount of light incident on the light measuring area can be maximized. Also, since the noise such as dispersed light is exhausted by the spherical lens outside the light measuring area, the effect by the noise can be minimized.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A fingerprint sensor comprising:
    a light emitting portion operates to project light though a substrate and a first optical TFT coupled to the substrate to a microlens that operates to change a path of light reflected by a fingerprint structure; and
    second optical-TFT coupled to the substrate that operates to check the fingerprint structure from the light whose path is changed.

2. The fingerprint sensor as claimed in claim 1, wherein a spherical lens having a convex shape of a predetermined curvature is formed at a side of the microlens.

3. The fingerprint sensor as claimed in claim 2, wherein the curvature of the spherical lens is determined by a degree that an input light is reflected.

4. The fingerprint sensor as claimed in claim 1, wherein a rear surface having a flat surface to reflect the input light is formed at the opposite side of the microlens.

5. The fingerprint sensor as claimed in claim 4, wherein the rear surface comprises a rear surface focal point that is the focus of the input light.

6. The fingerprint sensor as claimed in claim 1, wherein a plurality of microlenses are arranged as the microlens.

7. The fingerprint sensor as claimed in claim 1, wherein the microlens exhausts dispersed light to the outside of the TFT.

8. The fingerprint sensor as claimed in claim 1, wherein the microlens is formed of a high refractive material.

9. The fingerprint sensor as claimed in claim 4, wherein the first TFT includes a light transmitting area where light is transmitted; and the second TFT includes a-light measuring area where the transmitted light is incident by being reflected by the rear surface.

10. The fingerprint sensor as claimed in claim 9, wherein the light measuring area converts the reflected light to an electric signal.

11. The fingerprint sensor as claimed in claim 9, wherein the light transmitting area and the light measuring area have an inverse symmetric structure.

12. A fingerprint sensor using a microlens, the fingerprint sensor comprising:

a light emitting portion emitting input light through a substrate coupled to a first optical TFT; the microlens including a spherical lens having a predetermined curvature to change a path of the input light reflected by a fingerprint structure; and second optical-TFT coupled to the substrate having a light measuring area which receives reflected light whose path is changed and converting the reflected light to an electric signal.

13. The fingerprint sensor as claimed in claim 12, wherein focus of the input light is formed on the opposite surface of the spherical lens.

14. The fingerprint sensor as claimed in claim 12, wherein the first optical-TFT further comprises a light transmitting area having an inverse symmetric structure to the light measuring area and transmitting the input light

.

* * * * *